W. G. SCOTT.
MEANS EMPLOYED IN ACCOUNTING SYSTEMS.
APPLICATION FILED FEB. 24, 1920.

1,405,559.

Patented Feb. 7, 1922.

INVENTOR
WILMER G. SCOTT

BY
ATTY'S

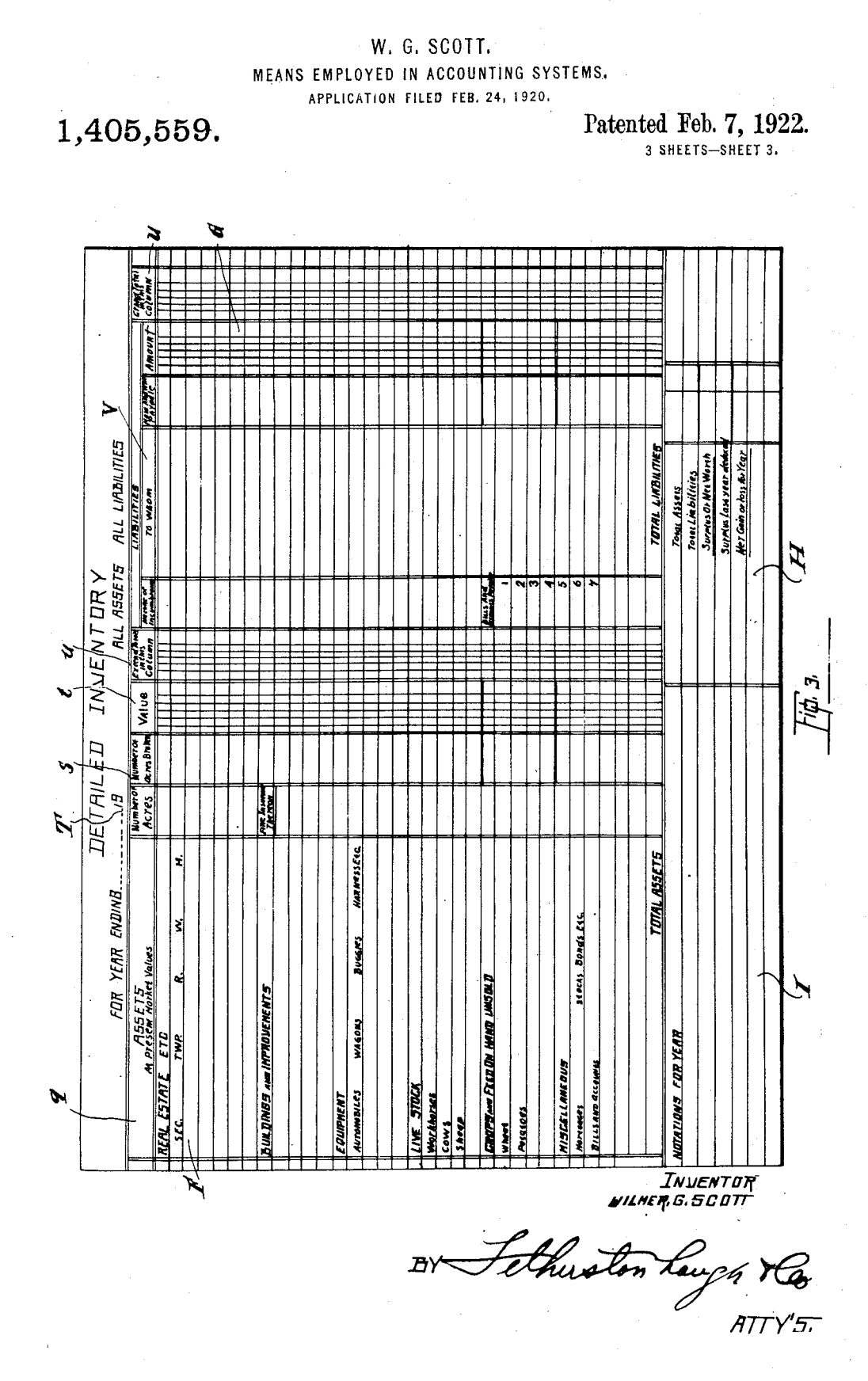

W. G. SCOTT.
MEANS EMPLOYED IN ACCOUNTING SYSTEMS.
APPLICATION FILED FEB. 24, 1920.

Patented Feb. 7, 1922.

UNITED STATES PATENT OFFICE.

WILMER G. SCOTT, OF VANCOUVER, BRITISH COLUMBIA, CANADA, ASSIGNOR TO CELESTINE G. SCOTT, OF WASHINGTON, DISTRICE OF COLUMBIA.

MEANS EMPLOYED IN ACCOUNTING SYSTEMS.

1,405,559.      Specification of Letters Patent.      Patented Feb. 7, 1922.

Application filed February 24, 1920. Serial No. 360,853.

*To all whom it may concern:*

Be it known that I, WILMER GLADSTONE SCOTT, a subject of the King of Great Britain, and resident of the city of Vancouver, in the Province of British Columbia, Dominion of Canada, have invented certain new and useful Improvements in Means Employed in Accounting Systems, of which the following is a specification.

This invention relates to improvements in accounting system, and the objects of the invention are to provide a system particularly designed for farmers, in which accounts may be kept of transactions of the farm in such a way that at the end of the year a balance may be produced which will show in a simple manner the profit or loss in each department of the farm together with the final profit or loss of the year's operation.

Further objects are to provide such a system as may be operated by any person unfamiliar with the principles of bookkeeping but which will nevertheless produce a statement which will display the exact nature of all transactions and which may be audited or checked in an effective and simple manner. The invention consists essentially of the improved series of statement forms constructed and arranged as shown in detail in the accompanying specification and drawings.

In the drawings:

Figure 2 shows the form for the yearly statement.

Figure 3 shows the form for the inventory.

In the drawings like characters of reference indicate corresponding parts in all the figures.

Figure 1:
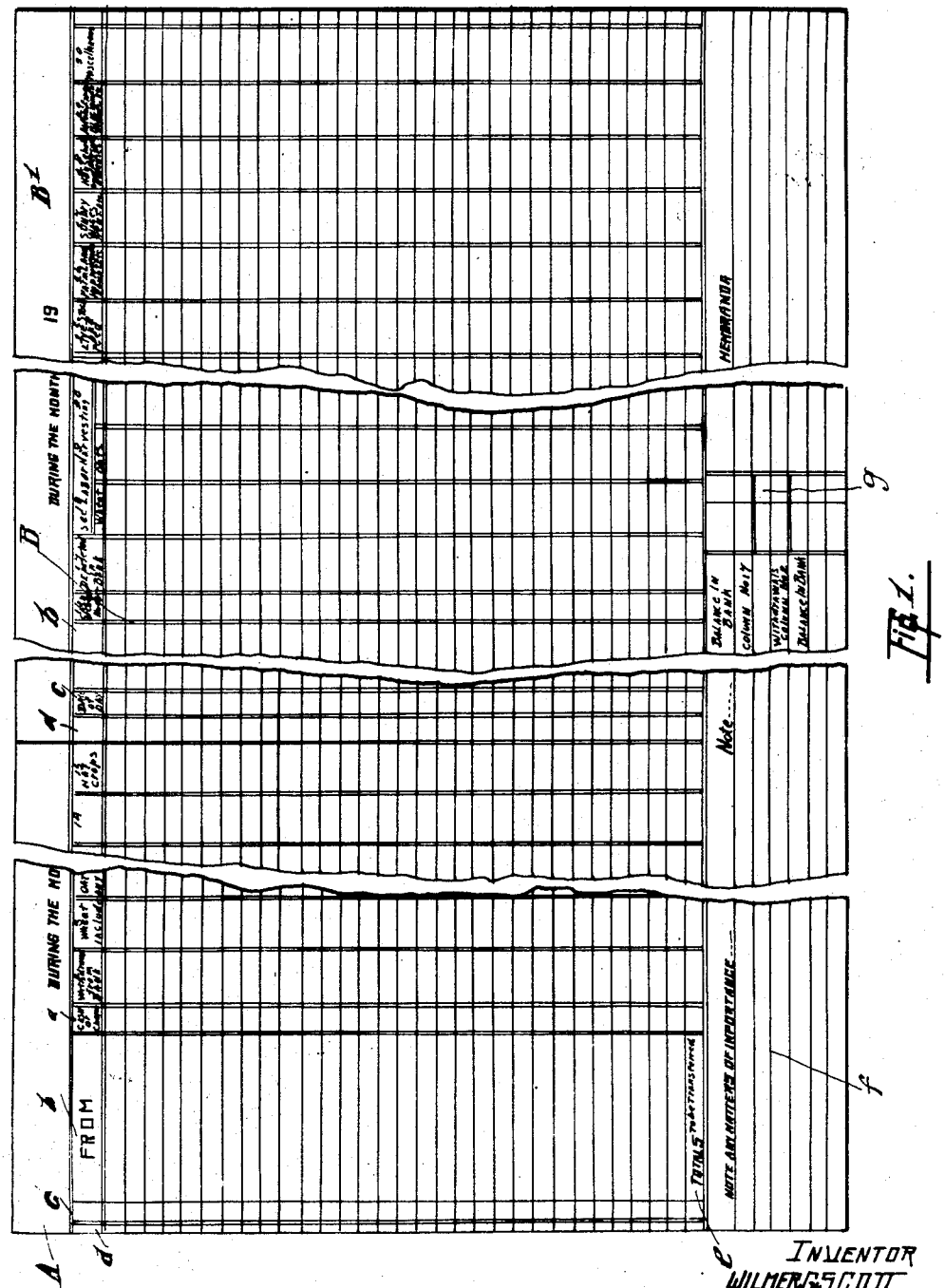
Figure 1 shows the form for the monthly statement.

Referring to the drawings, and first to the form shown in Figure 1 which represents the monthly statement, it will be seen that the form is divided into two parts, A for the monies paid out, and B for the monies received. Each of these forms is provided with a series of numbered columns $a$, the numbers of the columns being consecutive in the two columns, that is to say, for example in the columns $a$ the columns will be numbered from 1 to 15, and in the columns $b$ the columns will be numbered from 16 to 30. The heads of the columns are provided with suitable names, for example the following headings may be provided for the columns in form A: 1. Cash or cheque; 2. Withdrawn from bank; 3. Wheat; 4. Oats, etc., . . . 15. Hay crops. Headings are provided below the numbers in the columns in the form B, these headings may be for instance as follows: 16. Cash or cheque number; 17. Deposited in bank. Several headings may be provided for the columns 18 to 23 inclusive: Seed, labor, harvesting, etc., with subheadings, wheat, oats, etc., . . . 25. Live stock and feed; 26. Farm land improvements, equipment, etc.; 27. Sundry wages, rent, etc.; 28. Household and personal expenses; 29. Automobile expenses, blacksmithing, etc.; 30. Miscellaneous. To the left of the column $a$ on the form A, a column $b$ is provided in which information may be retained as to the origin of the item being placed as a heading at the top of the column. An additional column $c$ is placed adjacent to the column $b$ and adapted to receive the date, and adjacent the column $c$ a column $d$ can be placed for checking purposes. The form B may be provided on the left hand side with columns corresponding to the columns $b$, $c$ and $d$. The forms A and B are both provided with horizontal ruling, forming horizontal columns $e$ being for the totals of the month and having the word "Total" marked in the column $b$. Below the forms A and B a space $f$ is provided for memorandum or notes of any importance, and a form $g$ is also provided to indicate the bank balance, this form being ruled and provided with a space to indicate the balance in the bank at the end of the last month, a space in which total deposits this month may be added as per column No. 17 and a space for cheques and withdrawals as per column No. 2 and a space for the balance.

Figure 2:
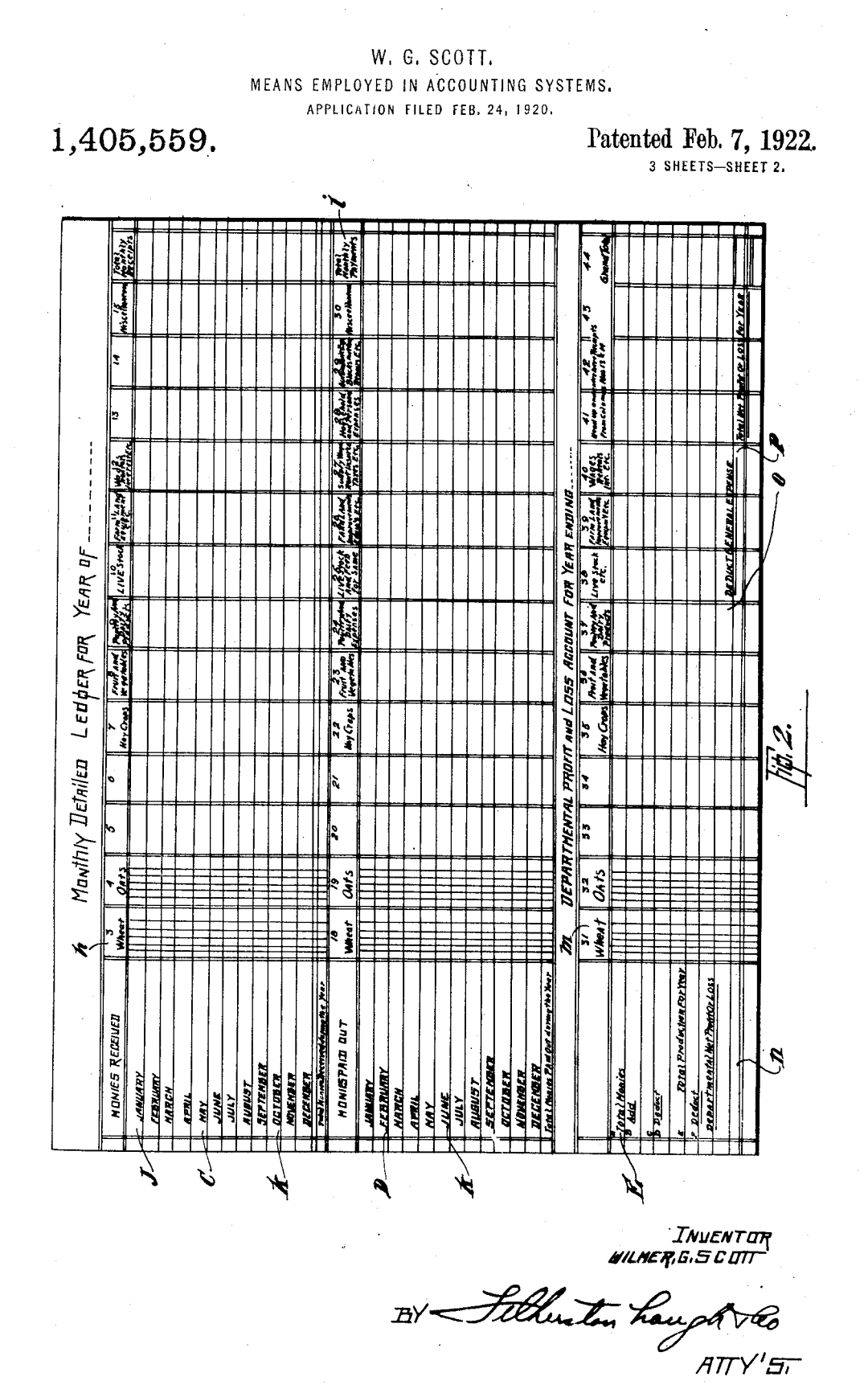

Referring next to Figure 2, which consists of a ledger account for the year, in which the monthly accounts are summarized. It will be seen that this form is divided into two parts, C and D corresponding to the parts A and B, the part C having a number of columns $h$ corresponding in number to the columns $a$ in the statement A, while form D has numbered columns $i$ corresponding with the columns in the form B, said columns being numbered and provided with the same headings as in the forms A and B. Each of the forms C and D are provided at the left hand side with relatively wide columns $j$ in which the months of the year are placed and form headings for the horizontal columns $k$, both forms C and D being ruled horizontally, producing a plurality of horizontal columns. The lowermost horizontal columns in each of the forms C and D are for the total of the monies received and paid out for each item during the year below the forms C and D.

A form E is provided by which the profit or loss for the year is determined for each department and for the business as a whole. This form is divided into a series of numbered columns $m$, the numbers commencing where the numbers in the other forms leave off so that a separate number will be provided in the monthly form and in the profit and loss account. Thus, for example, the form is provided with numbered and designated titles at the top as follows: 31. Wheat; 32. Oats; 33 and 34. Blanks for suitable items; 35. Hay crops; 36. Fruits and vegetables; 37. Poultry and dairy products; 38. Live stock, etc.; 39. Farm land, improvements, equipment, etc.; 40. Wages, rentals, interest, etc.; 41 and 42. Receipts from columns 13 and 14 on the monthly form; 44. Grand total. It is obvious that the numbered columns may be made to correspond with the different requirements of the business. Adjacent to the column 31 a column $n$ is provided, and the entry form is divided by ruling into a plurality of horizontal columns, these columns having different headings such as the following: ($a$) Total monies received as per statement above. ($b$) Add present market value of any quantity on hand unsold. ($c$) Total of items ($a$) and ($b$). ($d$) deduct value of any quantity on hand unsold at the end of last year. ($e$) Total production for year. ($f$) Deduct total monies paid out as per statement above. ($g$) Departmental net profit or loss.

It will be seen that the headings for these columns contain articles by which the departmental net profit or loss is ascertained. The net totals are then carried to column 44 and in the next lowermost horizontal column $o$ the heading is provided reading: Deduct general expense, that is, the total of columns Nos. 27, 28, 29 and 30. In the lowermost column $p$ the heading Total net profit or loss for the year is provided, thus the figures for each department will be placed at the foot of the column 44.

Figure 3 shows the form used to indicate the inventory at the end of the year. It is divided into two adjacent forms F for the assets and G for the liabilities, each form being divided by horizontal ruling having numbered columns at the right hand side, the form F being provided with a relatively wide column $q$ having a heading Assets. Additional horizontal columns are provided with headings and subheadings, for instance as partially shown the first heading is Real estate, lands, etc. Beneath which subheadings are arranged with a space in order that a description of the farm land may be inserted. The next heading is Buildings and improvements with four or five blank lines in which may be inserted a description thereof. The next heading is Equipment, subdivided for automobiles, wagons, buggies, harness, etc., implements, threshing machine, and miscellaneous. The next heading is Live stock, subdivided for work-horses, cows, sheep, steers, hogs, colts, calves, poultry. The next heading is Crops and feed on hand unsold, subdivided for wheat, oats, barley, flax, sundry, potatoes, other vegetables, apples, peaches, pears, other fruits, and hay. The next heading is Miscellaneous, subdivided for mortgages, stocks, bonds, etc., bills and accounts receivable, cash on hand and in bank, cash surrender value of life insurance (amount carried). Adjacent to the column $g$ an additional column is provided for the number of acres in the farm, and the number of acres broken, are set forth in a column $s$. Adjacent to the column $s$ a column $t$ for the value of the farm and a column $u$ for the total.

The form G is provided with a relatively wide column V, headed Liabilities and subdivided into four subcolumns in which are set forth incumbrances, to whom due or when payable and amount. Adjacent to the column V is another column $u$ for the totals. Below the forms F and G is a form H in which the results of the inventory may be tabulated, the assets, liabilities, surplus, the net gain or loss during the year being indicated as shown. In a separate column adjacent to this, a column I may be provided for any special business during the year.

In using the form the farmer works first the monthly forms A and B, filling in any monies received or paid out in the proper columns. Then at the end of the year he transfers the totals from each month to the space provided in the forms C and D, only taking care to make entries in correspondingly numbered columns. The items in the form A are transferred to the same numbered columns in the form C, as for instance, an item in the column 18 in the form A will be transferred to a corresponding column in the form C and an item in the column 18 of the form B will be transferred to a corresponding column of D, and he thus fills in the form E according to the items therein contained, that is to say from forms C and D and his inventory in the form F thus finding his totals and the profit and loss for the year.

As many changes could be made in the above construction, and many apparently widely different embodiments of my invention, within the scope of the claims, constructed without departing from the spirit or scope thereof, it is intended that all matter contained in the accompanying specification and drawings, shall be interpreted as illustrative and not in a limiting sense.

What I claim as my invention is:

1. An account system comprising monthly statement sheets each divided into two sections for monies received and monies paid out both said sections having columns numbered consecutively from the beginning of one part to the end of the other part, a yearly statement sheet divided into a form for monies received and monies paid out, said form having columns bearing the same numbers and headings as on the monthly statement, and a profit and loss form having consecutively numbered columns, the numbers beginning at the point where the numbers on the monthly statement left off.

2. The combination with the device as claimed in claim 1 of an inventory form having vertical columns for assets and liabilities, with numbered horizontal columns formed wtih headings and subheadings to indicate the nature of the asset or liability, and being provided with a further form to indicate the sum of the assets and liabilities.

In witness whereof I have hereunto set my hand.

WILMER G. SCOTT.